United States Patent
Pickelman, Jr. et al.

(10) Patent No.: US 7,516,827 B2
(45) Date of Patent: *Apr. 14, 2009

(54) HYDRAULIC CONTROLLED FAN CLUTCH WITH INTEGRAL COOLING

(75) Inventors: Dale M. Pickelman, Jr., Marshall, MI (US); Theodore A. Malott, Jackson, MI (US); Neil E. Robb, Jackson, MI (US); Gary E. Hart, Indianapolis, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/674,973

(22) Filed: Feb. 14, 2007

(65) Prior Publication Data

US 2007/0215431 A1 Sep. 20, 2007

Related U.S. Application Data

(63) Continuation of application No. 10/624,070, filed on Jul. 21, 2003, now Pat. No. 7,178,656.

(51) Int. Cl.
*F16D 43/284* (2006.01)
*F16D 25/0638* (2006.01)
*F01P 7/02* (2006.01)

(52) U.S. Cl. .............................. 192/85 AA; 123/41.12; 192/103 F; 192/113.34

(58) Field of Classification Search ........................ None
See application file for complete search history.

(56) References Cited

U.S. PATENT DOCUMENTS

| | | | | | |
|---|---|---|---|---|---|
| 2,960,202 | A | * | 11/1960 | Stevens et al. | 192/85 F |
| 3,458,020 | A | * | 7/1969 | Otto | 192/58.62 |
| 3,559,786 | A | * | 2/1971 | Long, Jr. | 192/58.682 |
| 3,688,884 | A | * | 9/1972 | Perrin et al. | 192/58.63 |
| 3,848,622 | A | * | 11/1974 | Cummings, III | 137/468 |
| 3,927,830 | A | * | 12/1975 | Briski | 62/225 |
| 4,094,393 | A | * | 6/1978 | Spokas | 192/82 T |
| 4,214,652 | A | * | 7/1980 | Quenneville | 192/58.92 |
| 4,425,879 | A | * | 1/1984 | Shadday et al. | 123/41.12 |
| 4,586,594 | A | * | 5/1986 | Duminy | 192/103 FA |
| 4,633,986 | A | * | 1/1987 | Matson | 192/18 A |
| 5,119,923 | A | * | 6/1992 | Jonsson et al. | 192/70.12 |
| 5,261,517 | A | * | 11/1993 | Hering | 192/85 AA |
| 5,346,441 | A | * | 9/1994 | Kurz et al. | 475/116 |
| 5,487,457 | A | * | 1/1996 | Isanhart | 192/58.2 |
| 5,667,045 | A | * | 9/1997 | Cummings, III | 192/18 A |
| 5,855,266 | A | * | 1/1999 | Cummings, III | 192/58.42 |
| 5,937,979 | A | * | 8/1999 | Cummings | 192/18 A |
| 5,947,247 | A | * | 9/1999 | Cummings, III | 192/70.12 |
| 7,047,911 | B2 | * | 5/2006 | Robb et al. | 123/41.12 |
| 7,178,656 | B2 | * | 2/2007 | Pickelman et al. | 192/103 F |
| 2006/0254540 | A1 | * | 11/2006 | Tuttle | 123/41.49 |

* cited by examiner

*Primary Examiner*—Rodney H Bonck
(74) *Attorney, Agent, or Firm*—John A. Artz

(57) ABSTRACT

A hydraulically controlled fan drive system (12) having a method of engagement includes a housing assembly (20) containing a hydraulic fluid (48) and an engaging circuit (36). The engaging circuit (36) includes a pitot tube (152) coupled within the housing assembly (20) that receives at least a portion of the hydraulic fluid (48). An engaging circuit (36) engages the housing assembly (20) to a fan shaft (44) in response to supply of the hydraulic fluid (48) from the pitot tube (152).

22 Claims, 5 Drawing Sheets

HYDRAULIC CONTROLLED FAN CLUTCH WITH INTEGRAL COOLING

RELATED APPLICATION

This is a continuation of U.S. application Ser. No. 10/624,070 filed on Jul. 21, 2003.

TECHNICAL FIELD

The invention relates generally to fan drive systems and more specifically to a hydraulically controlled fan drive system with integral cooling.

BACKGROUND ART

The present invention relates to friction coupling devices and fluid coupling devices such as friction clutch assemblies and viscous drives; the fluid coupling devices being of the type that include both a fluid operating chamber and a fluid reservoir chamber, and valving to control the quantity of fluid in the operating chamber.

Although the present invention may be used advantageously in various configurations and applications, it is especially advantageous in a coupling device of the type used to drive a radiator cooling fan of an internal combustion engine for a over the road truck, such as a class 8 truck, and will be described in connection therewith.

Friction coupling devices and fluid coupling devices that drive radiator cooling fans are generally of two types, dry friction clutch assemblies and viscous drives, respectively.

Dry friction clutch assemblies tend to have two operating conditions "ON and OFF" referring to when a friction clutch is either fully engaged or fully disengaged. When a friction clutch assembly is providing cooling the clutch is fully engaged and not slipping. When the friction clutch assembly is not providing cooling the assembly is fully disengaged and slip speed is at a maximum between a clutch plate and an engagement surface.

The dry friction clutch assemblies generally have low thermal capacity, since they typically do not incorporate fluid flow cooling mechanisms. Thus, the clutch assemblies have minimal cooling capability and are unable to cycle repeat in short durations of time. Also, because of low thermal capacity, the clutch assemblies are also limited in torsional capacity, such that they are incapable of engaging at high engine revolutions per minute (rpm) or high engine speeds. The thermal energy that is generated during engagement at high engine rpm speeds can "burn up" or cause the clutch assembly to become inoperative.

Viscous drives, on the other hand, have become popular due to their ability to cycle repeat, engage at higher engine speeds, and have varying degrees of engagement. Viscous drives have an operating range of engagement and are generally less engaged at higher engine speeds and generally more engaged at lower engine speeds. Viscous drives are never fully engaged for internal viscous shear purposes.

Unfortunately, viscous drives are also thermally and torsionally limited. Viscous drives are always slipping to some degree causing them to be incapable of turning at fully engaged peak operating speeds or at higher speeds than originally designed. Since viscous drives are continuously slipping, they are continuously generating heat, unlike friction clutch assemblies. Viscous drives are further limited in that the more engine cooling needed the larger and more costly the viscous drive and cooling fan that is required. Thus, for increased engine cooling requirements viscous drives can become impractical in size and cost.

Due to increased engine cooling requirements, a current desire exists for a fan drive system that is capable of not only providing an increased amount of cooling over traditional fan drive systems but also that it have the associated advantages of a friction clutch assembly and of a viscous drive, as stated above, without the associated disadvantages. It is also desirable that the fan drive system be practical and reasonable in size and cost, so as to be approximately similar to and preferably not to exceed that of traditional fan drive systems.

SUMMARY OF THE INVENTION

The present invention addresses the issues described above and provides a system and method of engaging a fan drive. A hydraulically controlled fan drive system having a method of engagement is provided. The hydraulically controlled system includes a housing assembly containing a hydraulic fluid and an engaging circuit. The engaging circuit includes a pitot tube coupled within the housing assembly that receives at least a portion of the hydraulic fluid. An engaging circuit engages the housing assembly to a fan shaft in response to supply of the hydraulic fluid from the pitot tube.

One of several advantages of the present invention is that it converts fluid velocity into pressure through use of the pitot tube to generate normal force for engagement purposes. In so doing, the present invention provides variable engagement via internal hydraulic pressure control. The pitot tube provides an inexpensive pressure supply source that requires minimum space within the fan drive system.

Another advantage of the present invention is that it includes multiple cooling devices for additional cooling of the fan drive system. The cooling devices include a variable cooling circuit and a dual part clutch housing with integrated cooling fins. In having increased fan drive system cooling the present invention is capable of rotating at high speeds for increased cooling capability and minimizes size of the drive system.

Furthermore, the present invention provides a fan drive system that incorporates cooling, engagement circuitry, and control circuitry within a single assembly allowing for ease of assembly and integration into a larger system such as an engine or a vehicle, while at the same time being capable of utilizing external control circuitry.

Moreover, the present invention defaults to an engaged state providing engine cooling when control systems are inoperative and in so doing also provides diagnostic ease.

Yet another advantage of the present invention is that it provides versatility in control in that multiple style control circuits may be utilized depending upon the application.

The present invention itself, together with attendant advantages, will be best understood by reference to the following detailed description, taken in conjunction with the accompanying figures.

BEST MODE(S) FOR CARRYING OUT THE INVENTION

Figure 1:
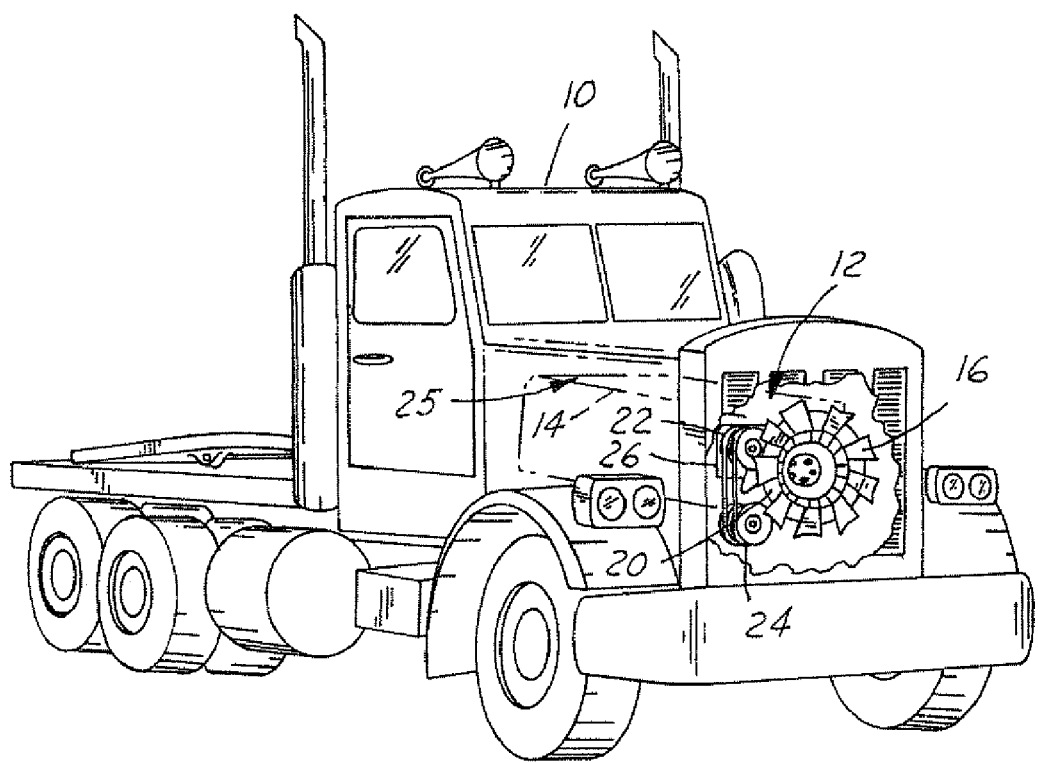
FIG. 1 is a perspective view of a vehicle utilizing a hydraulically controlled fan drive system in accordance with an embodiment of the present invention.

In the following figures the same reference numerals will be used to refer to the same components. While the present invention is described with respect to a method and system for a hydraulically controlled fan drive system, the present invention may be adapted and applied to various systems including: vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a hydraulically controlled fan drive system 12 in accordance with an embodiment of the present invention is shown. The system 12 uses rotational energy from a liquid cooled engine 14 at an increased ratio to turn a radiator cooling fan 16 to provide airflow through a radiator 18. The system 12 includes a housing assembly 20 fixed to a pulley 22, which is coupled to and rotates relative to a crankshaft (not shown) of the engine 14, via a pair of belts 24, within an engine compartment 25. Of course, the present invention may be relatively operative in relation to various components and via any number of belts or other coupling devices, such as a timing chain. The housing assembly 20 is mounted on the engine 14 via a mounting bracket 26. The housing assembly 20 hydraulically engages the fan 16 during desired cooling intervals to reduce temperature of the engine 14 or to perform other tasks further discussed below.

The fan 16 may be attached to the housing assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figure 2A:
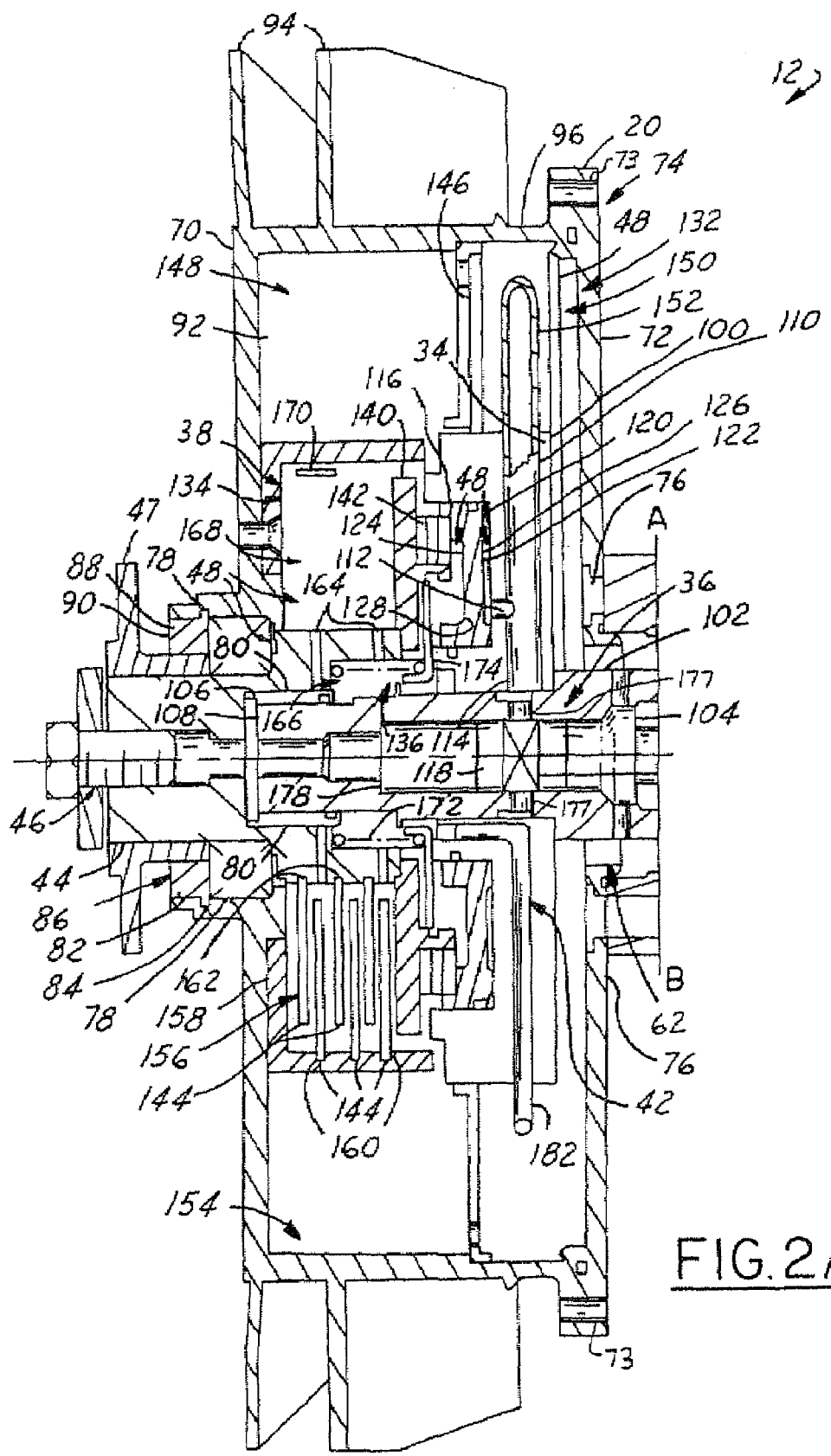
FIG. 2A is a first portion of a cross-sectional view of the hydraulically controlled system in accordance with an embodiment of the present invention.
Figure 2B:
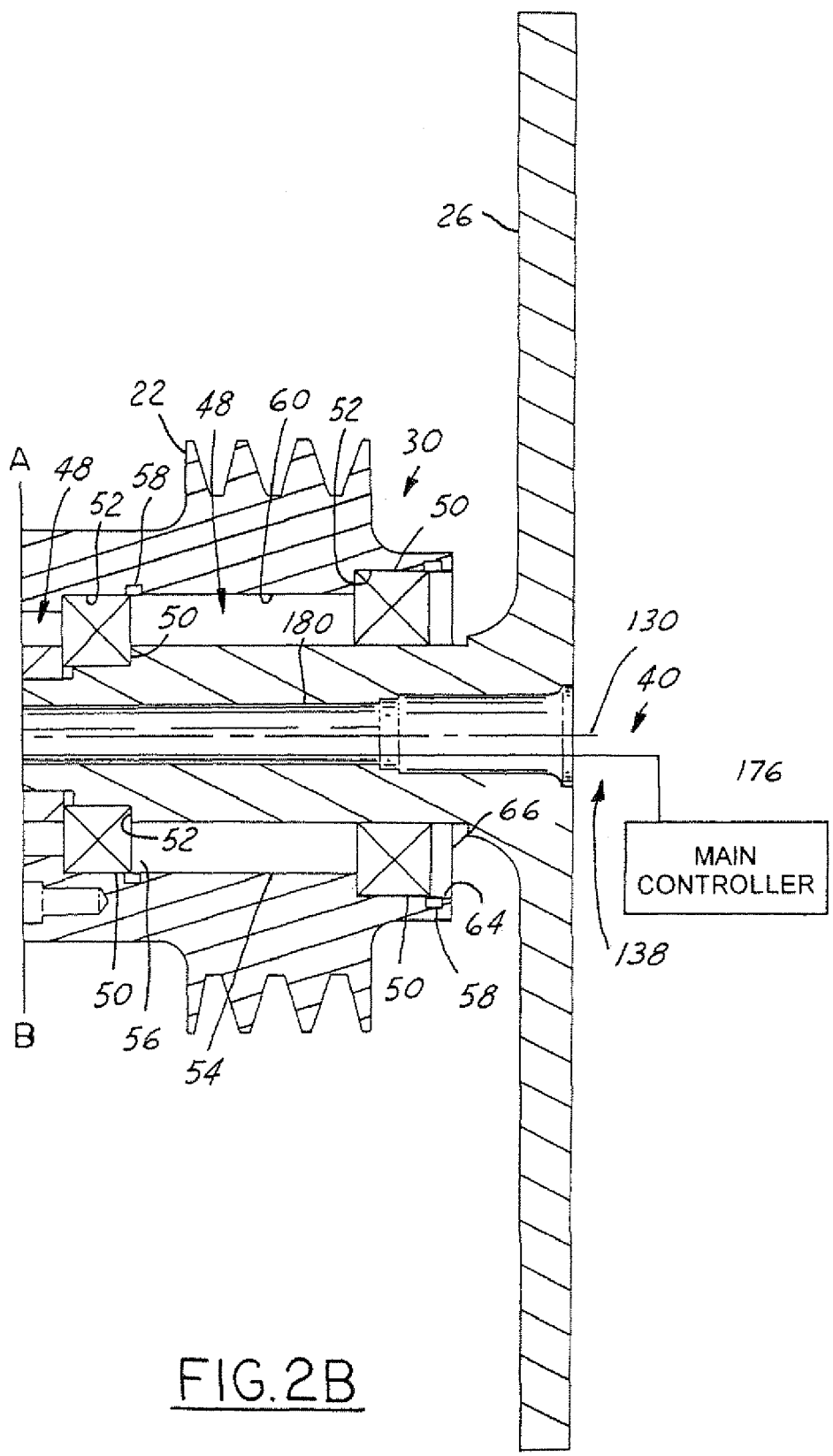
FIG. 2B is a second portion of a cross-sectional view of the hydraulically controlled system in accordance with an embodiment of the present invention.

Referring now to FIGS. 2A and 2B, a first portion and a second portion of a cross-sectional view of the system 12 in accordance with an embodiment of the present invention are shown. The system 12 includes an input circuit 30, the housing assembly 20, a piston assembly 34, an engaging circuit 36 having an mechanical portion 38 and a electrical portion 40, and a variable cooling and lubrication circuit 42. The input circuit 30 provides rotational energy to the housing assembly 20. The engaging circuit 36 engages the housing assembly 20 to a fan shaft 44, via the piston assembly 34, to rotate the fan 16. The fan 16 may be coupled to the fan shaft 44 via splines 46, which is threaded into the fan shaft 44, or by other techniques known in the art, such as being coupled to the fan hub 47. The fan shaft 44 may be a single unit, as shown, or may be split into a fan shaft portion and a clutch shaft portion. The variable cooling circuit 42 provides distribution of hydraulic fluid 48 throughout and in turn cooling and lubricating components within the housing assembly 20. The hydraulic fluid may be an oil-based fluid or similar fluid known in the art.

The input circuit 30 includes the pulley 22 that rotates about the mounting bracket 26 on a set of pulley bearings 50. The pulley bearings 50 are held between pulley bearing notches 52, in a stepped inner channel 54 of the pulley 22, and pulley bearing retaining rings 56, that expand into pulley ring slots 58 in an interior wall 60 of the pulley 22. The pulley 22 may be of various type and style, as known in the art. The inner channel 54 corresponds with a first center opening 62 in the housing assembly 20. The hydraulic fluid 48 flows through the center opening 62 into the inner channel 54 and cools and lubricates the bearings 50. A first seal 64 resides in the inner channel 54 on an engine side 66 of the pulley 22 for retaining the hydraulic fluid 48 within the housing assembly 20.

The housing assembly 20 includes a die cast body member 70, and a die cast cover member 72, that may be secured together by bolts (not shown) through channels 73 of the outer periphery 74 of the die cast member 70 and cover member 72. The die cast member 70 and the cover member 72 may be secured together using other methods known in the art. It should be understood that the present invention is not limited to use with a cast cover member, but may also be used with other members such as a stamped cover member. The housing assembly 20 is fastened to the pulley 22, via fasteners (not shown) extending through the cover member 20 into the pulley 22 in designated fastener holes 76. The housing assembly 20 rotates in direct relation with the pulley 22 and rides on housing bearings 78 that exists between the housing assembly 20 and the fan shaft 44. The housing bearing 78 is held within the housing assembly 20 between a corresponding housing bearing notch 80 in the body member 70 and a housing bearing retainer ring 82 that expands into a housing ring slot 84. A second center opening 86 exists in the body member 70 to allow the hydraulic fluid 48 to also circulate, cool, and lubricate the housing bearings 78. A second seal 88 resides on a fan side 90 of the housing assembly 20 for retaining the hydraulic fluid 48 within the housing assembly 20.

The body member 70 has a fluid reservoir 92 containing the hydraulic fluid 48. Cooling fins 94 are coupled to an exterior side 96 of the body member 70 and perform as a heat exchanger by removing heat from the hydraulic fluid 48 and releasing it within the engine compartment 25. The cover member 72 may be fastened to the body member 70 using various methods known in the art. For further explanation of the housing assembly 20 see U.S. patent application Ser. No. 09/711,735, entitled "Molded Cooling Fan", which is incorporated by reference herein. Note, although the fan 16 is shown as being attached to the body member 70 it may be coupled to the cover member 72.

The piston assembly 34 includes a piston housing 100 rigidly coupled to a distribution block 102, which is rigidly coupled to the bracket 26 on a first end 104. The distribution block 102 is coupled to a fan shaft bearing 106 on a second end 108, which allows the fan shaft 44 to rotate about the second end 108. The piston housing 100 has a main pitot tube channel 110, that has a piston branch 112 and a controller branch 114, for flow of the hydraulic fluid 48 to a translating piston 116 and to a hydraulic fluid controller 118. The piston 116 is coupled within a toroidally shaped channel 120 of the housing 100 and has a pressure side 122 and a drive side 124, with a respective pressure pocket 126 and drive pocket 128. The piston translates along a center axis 130 to engage the housing assembly 20 to the fan shaft 44, via hydraulic fluid pressure from the piston branch 112.

The engaging circuit 36 includes a hydraulic fluid supply circuit 132, a clutch plate assembly 134, a return assembly 136, and a control circuit 138. The hydraulic circuit 132 applies pressure on the piston 116 to drive an end plate 140, riding on a separation bearing 142 between the endplate 140 and the piston 116, against clutch plates 144 within the clutch plate assembly 134 and engages the fan 16. The control circuit 138 controls operation of the piston 116 and engagement of the fan 16. Of course, any number of clutch plates may be used. Also, although a series of clutch plates are utilized to engage the fan 16 other engagement techniques known in the art may be utilized.

The hydraulic circuit 132 may include a baffle 146 separating a relatively hot cavity side 148 from a relatively cool cavity side 150 of the fluid reservoir 92 and a pressure pitot tube 152. The pressure tube 152 although shown as being tubular in shape may be of various sizes and shapes. The pressure tube 152 receives hydraulic fluid 48 from within the cool side 150, providing cooling to the engaging circuit 36, due to flow of the fluid 48 from rotation of the housing assembly 20, carrying the fluid 48 in a radial pattern around an inner periphery 154 of the housing assembly 20. The pressure tube 152 is rigidly coupled within the main channel 110 and is therefore stationary. As fluid 48 is circulating about the inner periphery 154, a portion of the fluid 48 enters the pressure tube 152 and applies pressure on the pressure side 122 of the piston 116. Differential speed generated by the fluid 48 through the pressure tube 152 can be expressed according to Bernoulli's equation, shown as equation 1.

$$P_v = \frac{\rho V^2}{2g} \quad [1]$$

In using equation 1 resulting velocity V on the clutch plate assembly 134 is represented in terms of velocity pressure P, density ρ, and gravity g. Thus, as the rotational speed of the housing assembly 20 increases pressure applied on the clutch assembly 134 also increases providing variable drive speed of the fan 16, as further discussed below. Pressure P within the pressure tube 152 varies proportional with square of velocity V, and since torque of the fan 16 also varies with square of the velocity V, the fan 16 rotates at an approximately proportional constant percentage of input speed or velocity V.

Since the fan 16 has a variable drive speed due to proportional pressure within the pressure tube 152, at low engine speeds, such as during an idle condition, the fan 16 is rotating at a low speed. When the engine 14 is power OFF, there is minimum torque existing in the fan 16, which may be absorbed by the belts 24, unlike that of prior art systems. In a conventional fan clutch system when a fan is rotating or engaged, the fan is typically rotating at a high speed. When an engine is power OFF, torque existing in the conventional fan and fan clutch system is transferred into engine belts, degrading and damaging the belts. Some conventional systems incorporate electronic control devices, such that when an ignition system is powered OFF, the fan clutch system is disengaged before the engine is powered OFF. The additional electronic control devices add complexity and costs. Also, it is generally undesirable to allow an engine to continue ruing for a time period after an ignition is powered OFF. The present invention eliminates the need for the additional electronic devices and the initial disengagement of a fan clutch system, due to its proportional fan rotating speed design as stated above.

The clutch plate assembly 134 includes a clutch pack 156 within a drum housing 158. The clutch pack 156 includes the multiple clutch plates 144 separated into a first series 160 coupled to the drum housing 158 and a second series 162 coupled to the fan shaft 44. The piston 116 drives the endplate 140 to apply pressure on the clutch plates 144, which engages the fan 16. The fan shaft 44 has multiple cooling passageways 164 that extend between a fan shaft chamber 166 and an inner drum chamber 168 allowing passage of fluid 48 therein. Fluid 48 after entering the drum chamber 168 passes across and directly cools the plates 144 and returns to the fluid reservoir 92 through slots 170 in the drum housing 158. The slots 170 may be of various size and shape and have various orientations relative to the center axis 130. The cooling passageways 164 although shown as extending perpendicular to the center axis 130 may extend parallel to the center axis 130, similar to the slots 170.

The return assembly 136 includes a set of return springs 172 and a spring retainer 174. The springs 172 reside in the fan shaft chamber 166 and are coupled between the fan shaft 44 and the spring retainer 174. The spring retainer 174 has a quarter cross-section that is "L" in shape and is coupled between the drive side 124 and the end plate 140. The springs 172 are in compression and exert force on the piston 116 so as to disengage the clutch plates 144 when fluid pressure on the pressure side 122 is below a predetermined level.

The control circuit 138 includes the distribution block 102, the fluid controller 118, and a main controller 176. The distribution block 102 may have various configurations depending upon the type and style of the fluid controller 118, only one is shown. The distribution block 102 contains a return channel 177 coupled to the controller branch 114. The fluid controller 118 may be coupled within a main center channel 178 of the block 102, adjust fluid flow through the return channel 177, may be coupled within the bracket 26, or be external to the block 102 and bracket 26. When the fluid controller 118 is coupled within the bracket 26 or external therefrom, tubes (not shown) may couple and extend from the controller branch 114 to the fluid controller 118 through the main center channel 178 and possibly through a center portion 180 of the bracket 26, when externally coupled. As shown, the fluid controller 118 adjusts fluid flow through the controller branch 114 across the main center channel 178, via the return channel 177, whereafter the fluid returns to the reservoir 92. In adjusting fluid flow through the controller branch 114, the fluid controller 118 adjusts pressure received by the piston 116. As the fluid controller 118 decreases fluid flow through the controller branch 114 pressure in the piston branch 112 and on the piston 116 increases.

The fluid controller 118 may adjust fluid pressure electronically, mechanically, or by a combination thereof. The fluid controller 118 although shown as an electronically controlled proportioning valve, may be of various type and style known in the art. The fluid controller 118 may be in the form of a solenoid, a bimetal coil device, a valve, or in some other form of fluid controller. The fluid controller 118 may have internal logic or reactive mechanisms to determine when to alter fluid flow or may be coupled to a separate controller, as shown, for such determination. The fluid controller 118 when not receiving a power signal or in a default mode, is preferably in a closed state to increase pressure on the piston 116 and engage the clutch plates 144. Therefore, when the engine 14 is in operation the fluid controller 118 defaults to a closed state to provide cooling even when the controller 118 is inoperative. By having a default state of closed, diagnostic testing of the system 12 is easily accomplished by simply preventing the fluid controller 118 from receiving the power signal, which may be accomplished by electrically unplugging the controller 118 or through use of a diagnostic tool or controller (not shown).

A main controller 176 may be coupled to the fluid controller 118 and may be contained within the system 12 or may be separate from the system 12 as shown. The main controller 176 is preferably microprocessor based such as a computer having a central processing unit, memory (RAM and/or ROM), and associated input and output buses. The main controller 176 may be a portion of a central vehicle main control unit, an interactive vehicle dynamics module, a cooling system controller, or may be a standalone controller as shown. The main controller 176 generates a cooling signal containing information such as when cooling is desired and the amount of cooling that is desired. The fluid controller 118 in response to the cooling signal adjusts flow of the fluid 48 through the controller branch 114.

The main controller 176 may be used to derate or reduce rotational speed of the engine 14 and reduce traveling velocity of the vehicle 10. Even when cooling is not desired the main controller 176 may activate the fluid controller 118 to increase pressure on the piston 116 and engage the fan 16. Since at least a minimal amount of torque is utilized in operating the fan 16 the rotational speed of the engine 14 may thereby be reduced, everything else being the same.

The cooling circuit 42 includes a second pitot tube or lubrication tube 182. Although, only a single lubrication tube is shown, any number of lubrication tubes may be used, especially in applications where increased flow is desired. The lubrication tube 182 provides high flow rates at low pressures and as with the first tube may be of various size and shape. Fluid 48, from the cool side 150, enters the lubrication tube 182 and is directed into the fan shaft chamber 166 where it then passes through the cooling passageways 164 and cools the clutch pack 156. Fluid 48 may also exit the fan shaft chamber 166 through the slots 170. Fluid exiting from the fan shaft chamber 166 or the drum housing 158 enters the hot side 148, where the cooling fins 94 dissipate heat therefrom into the engine compartment 25. The cooling circuit 42 not only cools and lubricates the clutch pack 156 but also other portions of the engaging circuit 36.

Figure 3:
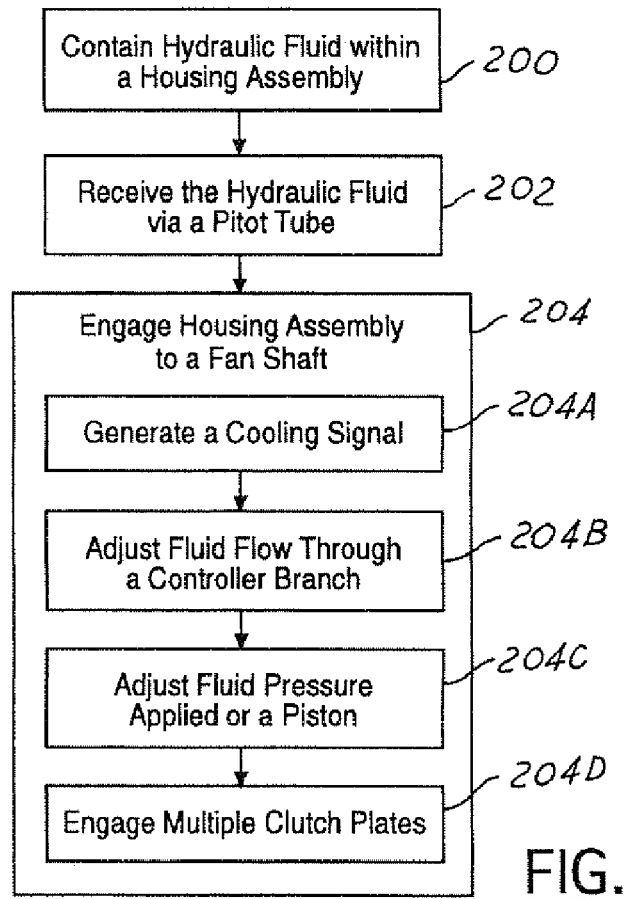
FIG. 3 is a logic flow diagram illustrating a method of engaging a hydraulically controlled fan drive system in accordance with an embodiment of the present invention.

Referring now to FIG. 3, a logic flow diagram illustrating a method of engaging the system 12 in accordance with an embodiment of the present invention is shown.

In step 200, the fluid 48 is contained within the housing assembly 20. In step 202, the pressure tube 152 receives at least a portion of the fluid 48.

In step 204, the housing assembly 20 is engaged to the fan shaft 44 to rotate the fan 16 in response to supply of the fluid 48 from the pressure tube 152. In step 204A, the main controller 176 generates the cooling signal to adjust fluid pressure on the piston 116. The main controller 176 may generate the cooling signal in response to operating temperature of the engine 14, to derate rotational speed of the engine 14, or to perform some other function known in the art. In step 204B, in response to the cooling signal the fluid controller 118 adjusts fluid flow through the controller branch 114.

In step 204C, fluid pressure on the piston 116 is adjusted in turn translating the piston 116 to force the endplate 140 to apply pressure on the clutch plates 144. The return springs 172 are overcome by fluid pressure applied in an opposing direction on the piston 116. The rotational speed of the housing assembly 20 in combination with the amount of fluid flow passing through the controller branch 114 and applied to the pressure side 122, which is directly related to the amount of pressure applied on piston 116.

In step 204D, the pressure applied on the piston 116 is directly transferred to the clutch plates 144. When pressure is applied on the clutch plates 144 the first series 160 is pressed against the second series 162, engaging the fan 16. Torque is generated on the clutch plates 144 and is approximately equal to the normal force of piston 116, multiplied by the number of plates 114, the coefficient of friction for wet friction hydrodynamic surfaces, such as surfaces of the clutch plates 144, and mean radius of plates 144. Therefore, rotational speed of the housing assembly 20 in combination with the amount of fluid flow passing through the controller branch 114 is also directly related to an amount of slip between the clutch plates 144 and the speed of the fan shaft 44.

Figure 4:
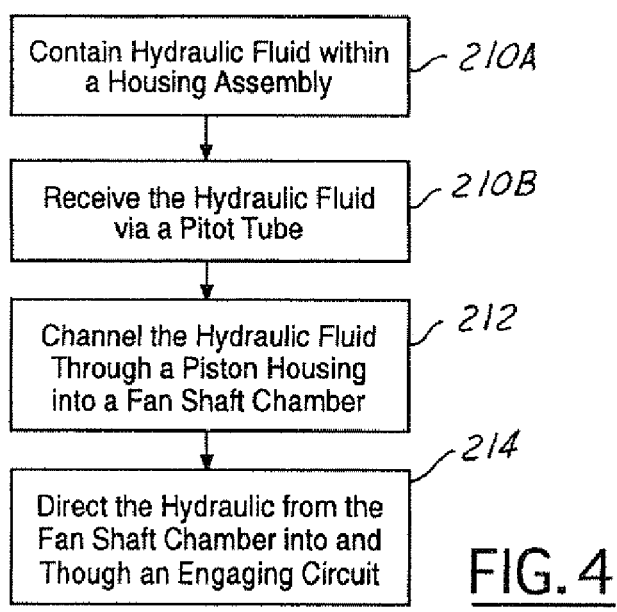
FIG. 4 is a logic flow diagram illustrating a method of cooling and lubricating an engaging circuit for the hydraulically controlled fan drive system in accordance with an embodiment of the present invention.

Referring now to FIG. 4, a method of cooling the engaging circuit 36 in accordance with an embodiment of the present invention is shown.

In step 210A-B, the lubrication tube 182 receives a portion of the fluid 48 contained within the reservoir 92 in a similar manner as that of the pressure tube 152.

In step 212, the fluid 48 is channeled through the piston housing 100 and into the fan shaft chamber 166 to cool the fan shaft 44 and return springs 172. This may become increasingly advantageous in times of repeated cycling of the system 12 between an engaged stated and a disengaged state.

In step 214, the fluid 48 is then passed from the fan shaft chamber 166 into the engaging circuit 36 where it is passed across and cools and lubricates the clutch plates 144 before reentering the reservoir 92. The fluid 48 also passes around and cools the spring retainer 174 and the piston 116.

Figure 5:
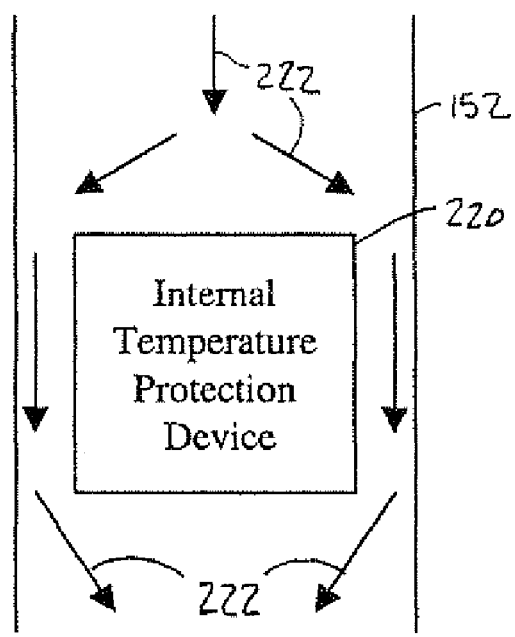
FIG. 5 is a cross-sectional view of a portion of the hydraulically controlled system utilizing an internal temperature protection device in accordance with another embodiment of the present invention.

Referring now to FIGS. 2A and 5, a cross-sectional view of a portion of the hydraulically controlled system 12 utilizing an internal temperature protection device 220 in accordance with another embodiment of the present invention is shown in FIG. 5. The device 220 is positioned within the pressure tube 152 between the piston branch 112 and the return channel 177. The arrows 222 represent flow of fluid 48 through the pressure tube 152. The device 220 is temperature sensitive in that when temperature within the housing assembly 20 is above a predetermined temperature level the device 220 closes or expands as to prevent passage of fluid 48. By preventing passage of fluid 48 a majority of the fluid within the pressure tube 152 is directed through the piston branch and fully engages the plates 144. By fully engaging the plates 144 there is no slip present between the plates 144 and temperature of the plates 14 as welt as the fluid 48 and the system 12 decreases. The device 220 may be mechanical or electrical in nature and may be in the form of a bi-metal, metal coil, a wax-pallet, or some other temperature sensitive valve or electrical switch or valve known in the art.

Figure 6:
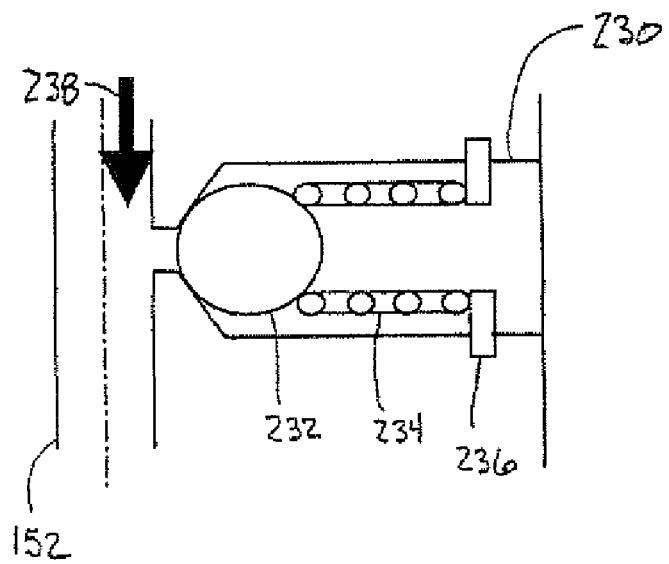
FIG. 6 is a cross-sectional view of a portion of the hydraulically controlled system utilizing a pressure relief valve in accordance with another embodiment of the present invention.

Referring now to FIG. 6 is a cross-sectional view of a portion of the hydraulically controlled system 12 utilizing a pressure relief valve 230 in accordance with another embodiment of the present invention is shown. The relief valve 230 is coupled to the pressure tube 152 and may include a ball 232, a spring 234, and a spring retainer 236. The arrow 238 represents direction of flow of the fluid 48. The relief valve 230 gradually opens when speed of the fan 16 is approximately greater than 3,000 rpm to prevent the fan from rotating faster than 3,000 rpm. The spring 234 is designed to balance pressure exerted on the ball, pressure exceeding a pre-determined level is relieved to atmosphere or returned the fluid reservoir 92, thus limiting the maximum pressure in the pressure tube 152. The relief valve 230 may be set to open at any pressure corresponding to any fan speed. The relief valve 230 prevents damage to the system 12 at high fan speeds. The relief valve 230 may be mechanical or electrical in nature and may be of various form and style.

The methods set forth in FIGS. 3 and 4 are only illustrative examples, and the steps may be performed synchronously, sequentially, or in a different order depending upon the application.

The present invention provides a fan drive system with increased internal cooling capacity over prior art fan drive systems. The present invention incorporates the advantages of both a friction clutch assembly and of a viscous drive including ability to cycle repeat, engage at higher engine rpm speeds, having varying degrees of engagement, and being able to be fully engaged or fully disengaged. By having variable fan operating speeds the present invention increases vehicle fuel economy, provides more consistent engine cooling, and reduces the amount of time that a radiator cooling fan is operating in a fully engaged mode.

Additionally, the present invention through use of pitot tubes provides an inexpensive engagement circuit and cooling and lubrication circuit entirely inclusive in a single housing assembly. The present invention also provides failsafe capability in that it is capable of defaulting to an engaged state or fan operative state when the hydraulic fluid controller or the main controller is inoperative. Furthermore, the present invention minimizes fan drive system operating noise by being capable of hydraulically engaging a radiator cooling fan at multiple selected or predetermined slower partially engaged speeds rather than at a fully engaged speed, when a fully engaged speed is not required.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A hydraulically controlled fan drive system comprising:
a housing assembly containing a hydraulic fluid; and
an engaging circuit coupled to said housing assembly and comprising;
a first pitot tube coupled within said housing assembly and receiving at least a portion of said hydraulic fluid; and
an electronically controlled hydraulic fluid flow controller coupled to said first pitot tube;
said engaging circuit engaging said housing assembly to a fan shaft in response to supply of said hydraulic fluid from said first pitot tube and variably controlling fluid pressure from said pitot tube via said hydraulic fluid flow controller;
wherein said fan drive system is only activated internally by an electric signal from said electronically controlled hydraulic fluid flow controller.

2. A system as in claim 1 wherein said engaging circuit comprises:
a clutch plate assembly coupled to said housing assembly and to a fan shaft and having at least one clutch plate; and
a piston applying pressure on said at least one clutch plate to engage said housing assembly to said fan shaft.

3. A system as in claim 2 wherein said clutch plate assembly comprises a drum housing said at least one clutch plate, said drum housing having at least one slot between a fluid reservoir of said housing assembly and a drum chamber, said at least one slot directly cooling said at least one clutch plate.

4. A system as in claim 1 wherein said housing assembly comprises cooling fins that perform as a heat exchanger.

5. A system as in claim 1 wherein said first pitot tube is coupled within a piston housing.

6. A system as in claim 1 wherein said first pitot tube supplies said hydraulic fluid to apply pressure on a piston in turn engaging said fan shaft.

7. A system as in claim 6 wherein said piston applies direct pressure on at least one clutch plate and engages said fan shaft to said housing assembly.

8. A system as in claim 6 wherein said piston comprises:
a pressure side with a pressure pocket; and
a drive side with a drive pocket.

9. A system as in claim 1 further comprising a return assembly coupled to said engaging circuit and said fan shaft and returning said engaging circuit to a disengaged state.

10. A system as in claim 1 wherein said housing assembly comprises:
a body member; and
a cover member coupled to said body member.

11. A system as in claim 1 wherein said hydraulic fluid flow controller is selected from at least one of a solenoid, bimetal coil device, and a valve.

12. A system as in claim 1 wherein said hydraulic fluid flow controller when not receiving power is in a closed state.

13. A system as in claim 1 further comprising a fluid distribution block rigidly mounted to a fixed bracket having at least one fluid passageway for hydraulic fluid pressure adjustment to said engaging circuit.

14. A system as in claim 13 wherein said fluid distribution block comprises a hydraulic fluid flow controller controlling passage of hydraulic fluid through said first pitot tube and said at least one fluid passageway.

15. A system as in claim 1 wherein said housing assembly comprises a relatively hot side and a relatively cool side, said first pitot tube receiving said hydraulic fluid from said relatively cool side.

16. A system as in claim 1 further comprising a pressure relief valve relieving pressure within said first pitot tube.

17. A system as in claim 1 wherein said hydraulic fluid flow controller mechanically adjusts fluid pressure to said engaging circuit.

18. A system as in claim 1 wherein said system is defaulted to an engaged state when said hydraulic flow controller is in said closed state by increase in fluid pressure to said engaging circuit.

19. A system as in claim 1 further comprising a main controller coupled to said hydraulic fluid flow controller and generating a cooling signal, said hydraulic fluid flow controller adjusting fluid flow pressure in response to said cooling signal.

20. A system as in claim 1 wherein said fluid flow controller bypasses flow of said hydraulic fluid to prevent engagement of said fan shaft.

21. A method of engaging a hydraulically controlled fan drive system comprising:
containing a hydraulic fluid within housing assembly;
electronically activating the system to receive at least a portion of said hydraulic fluid via a pitot tube; and
variably engaging said housing assembly to a fan shaft of an engine cooling fan in response to supply of said hydraulic fluid from said pitot tube and via a valve in fluid communication with and configured to adjust fluid pressure in said pitot tube;
wherein said fan drive system is only activated internally by an electric signal from an electronically controlled hydraulic fluid flow controller.

22. A method of cooling an engaging circuit of a hydraulically controlled fan drive system comprising:
containing a hydraulic fluid within housing assembly;

electronically activating the system to receive at least a portion of said hydraulic fluid via a pitot tube; and circulating fluid through the engaging circuit in response to said received hydraulic fluid;

wherein circulating fluid through the engaging circuit comprises:

channeling said hydraulic fluid through a piston housing into a fan shaft chamber;

directing said hydraulic fluid through said fan shaft chamber into and through a clutch pack; and directing said hydraulic fluid through a return assembly;

wherein said fan drive system is only activated internally by an electric signal from an electronically controlled hydraulic fluid flow controller.

* * * * *